United States Patent

Matsunaga et al.

(10) Patent No.: US 10,821,980 B2
(45) Date of Patent: Nov. 3, 2020

(54) VEHICLE CONTROL DEVICE

(71) Applicant: HONDA MOTOR CO., LTD., Minato-ku, Tokyo (JP)

(72) Inventors: Hideki Matsunaga, Wako (JP); Masaaki Nagashima, Wako (JP); Takumi Machida, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 141 days.

(21) Appl. No.: 16/156,133

(22) Filed: Oct. 10, 2018

(65) Prior Publication Data
US 2019/0111931 A1 Apr. 18, 2019

(30) Foreign Application Priority Data

Oct. 12, 2017 (JP) ................................. 2017-198160

(51) Int. Cl.
*B60W 30/18* (2012.01)
*B60W 30/095* (2012.01)
*G06N 5/02* (2006.01)

(52) U.S. Cl.
CPC .. *B60W 30/18163* (2013.01); *B60W 30/0956* (2013.01); *G06N 5/022* (2013.01); *B60W 2554/80* (2020.02)

(58) Field of Classification Search
CPC ....... B60W 2554/80; B60W 2554/804; B60W 2555/60; B60W 2556/50; B60W 2720/10; B60W 30/0956; B60W 30/143; B60W 30/18154; B60W 30/18163; G06N 5/022
See application file for complete search history.

(56) References Cited

U.S. PATENT DOCUMENTS

| 2005/0004744 | A1* | 1/2005 | Dieckmann | B60K 31/0008 701/96 |
| 2007/0027583 | A1* | 2/2007 | Tamir | G08G 1/164 701/1 |
| 2008/0172153 | A1* | 7/2008 | Ozaki | G08G 1/04 701/36 |
| 2014/0046581 | A1* | 2/2014 | Ota | G08G 1/096775 701/408 |

(Continued)

FOREIGN PATENT DOCUMENTS

| JP | 2016-002893 A | 1/2016 |
| JP | 2017-087906 A | 5/2017 |

OTHER PUBLICATIONS

Office Action dated May 14, 2019 issued over the corresponding Japanese Patent Application No. 2017-198160 with the English translation thereof.

*Primary Examiner* — Babar Sarwar
(74) *Attorney, Agent, or Firm* — Carrier Blackman & Associates, P.C.; Joseph P. Carrier; Jeffrey T. Gedeon

(57) ABSTRACT

A vehicle control device includes an overtaking prediction unit configured to predict an overtaking section where a host vehicle overtakes another vehicle that exists ahead of the host vehicle and in a second lane different from a first lane where the host vehicle is traveling, and a travel controller configured to perform travel control to overtake another vehicle. The travel controller performs travel control to adjust speed of the host vehicle in a case where the overtaking section predicted by the overtaking prediction unit entirely or partially overlaps a restricted section in which overtaking is restricted.

5 Claims, 8 Drawing Sheets

(56) References Cited

U.S. PATENT DOCUMENTS

| | | | |
|---|---|---|---|
| 2015/0166070 A1* | 6/2015 | Hoerwick | B60W 40/02 |
| | | | 701/532 |
| 2015/0353094 A1* | 12/2015 | Harda | B60W 30/18163 |
| | | | 701/23 |
| 2016/0272204 A1* | 9/2016 | Takahashi | B60W 30/16 |
| 2016/0297447 A1* | 10/2016 | Suzuki | B60W 30/18163 |
| 2016/0349751 A1* | 12/2016 | Sugimoto | B60W 10/20 |
| 2017/0137033 A1 | 5/2017 | Habu | |
| 2017/0183007 A1* | 6/2017 | Oh | B60W 50/14 |
| 2017/0247029 A1* | 8/2017 | Watanabe | G08G 1/167 |
| 2017/0327111 A1* | 11/2017 | Bonarens | B60W 30/08 |
| 2017/0329340 A1* | 11/2017 | Ulbrich | B60W 30/143 |
| 2018/0079420 A1* | 3/2018 | Aine | G08G 1/162 |
| 2018/0290657 A1* | 10/2018 | Ryne | G06K 9/00818 |
| 2019/0084561 A1* | 3/2019 | Takeda | B60W 30/14 |
| 2019/0086930 A1* | 3/2019 | Fan | G05D 1/0223 |

\* cited by examiner though the overtaking section does not overlap the restricted section, and a driving condition of a host vehicle in association with each other, and then performs an automated driving control in which the learning result is reflected. One example of the driving condition includes "overtaking".

VEHICLE CONTROL DEVICE

CROSS-REFERENCE TO RELATED APPLICATION

This application is based upon and claims the benefit of priority from Japanese Patent Application No. 2017-198160 filed on Oct. 12, 2017, the contents of which are incorporated herein by reference.

BACKGROUND OF THE INVENTION

Field of the Invention

The present invention relates to a vehicle control device that performs travel control of a host vehicle at least partially automatically.

Description of the Related Art

Techniques of performing a travel control of a driver's own vehicle (which will be also referred to as a host vehicle) at least partially automatically (automated driving technique or driving assistance technique) have conventionally been developed. For example, various devices in order to perform an automated driving control in which a driver's driving tendency is reflected have been proposed.

In Japanese Laid-Open Patent Publication No. 2017-087906, there is proposed a device that is made to learn in advance driving information indicative of driving operation and a driving condition of a host vehicle in association with each other, and then performs an automated driving control in which the learning result is reflected. One example of the driving condition includes "overtaking".

SUMMARY OF THE INVENTION

Incidentally, overtaking another vehicle is not permitted in all the road sections. For example, in a section where the overtaking is forbidden by traffic regulations or a section where the overtaking is not desirable for traffic safety reasons (hereinafter, referred to as restricted section), it is necessary to be careful not to overtake another vehicle.

However, the device according to Japanese Laid-Open Patent Publication No. 2017-087906 does not consider such situations, so that the overtaking may occur in the restricted section depending on the learning result (that is, driver's driving tendency).

The present invention has been made in order to solve the above problem, and an object is to provide a vehicle control device that is capable of preventing a host vehicle from overtaking another vehicle in a restricted section.

A vehicle control device according to the present invention is a device configured to perform travel control of a host vehicle at least partially automatically, including: an other vehicle recognition unit configured to recognize another vehicle that exists ahead of the host vehicle and in a lane different from a lane where the host vehicle is traveling; an overtaking prediction unit configured to predict a overtaking section where the host vehicle overtakes the other vehicle, on the basis of a relation between host vehicle information indicating a driving state of the host vehicle and another-vehicle information indicating a driving state of the other vehicle; and a travel controller configured to perform travel control to overtake the other vehicle, wherein the travel controller is configured to perform the travel control to adjust speed of the host vehicle in a case where the overtaking section predicted by the overtaking prediction unit entirely or partially overlaps a restricted section in which overtaking is restricted.

As described above, the speed of the host vehicle is adjusted in the case where the predicted overtaking section entirely or partially overlaps the restricted section in which overtaking is restricted. Thus, the position of the overtaking section can be moved so as not to overlap the restricted section. Accordingly, it is possible to prevent the host vehicle from overtaking another vehicle in the restricted section.

The overtaking prediction unit may newly predict an overtaking section after elapse of a predetermined time from a time point at which adjusting of the speed of the host vehicle is started or after driving a predetermined distance from a position at which adjusting of the speed of the host vehicle is started, and the travel controller may perform the travel control to overtake the other vehicle in a case where the newly predicted overtaking section does not overlap the restricted section. Therefore, a function of retrying the overtaking can be achieved, and thus the overtaking that is scheduled originally can be performed automatically and smoothly.

The restricted section may be at least one of a travel section including a railroad crossing, a travel section including an intersection, a travel section including a pedestrian crossing, a travel section including a bicycle crossing, and a travel section with a narrow width.

The other vehicle recognition unit may recognize whether the other vehicle is in traveling state or in stopped state, and the travel controller may adjust the speed of the host vehicle in a case where the overtaking section overlaps the restricted section entirely or partially regardless of whether the other vehicle is in traveling state or in stopped state. By assuming a scene where another vehicle that is in a stopped state suddenly starts to move, unintended overtaking in the restricted section can be prevented.

The other vehicle recognition unit may recognize whether the other vehicle that is in stopped state is in a parked state, and in a case where the other vehicle is in the parked state, the travel controller need not perform the travel control to adjust the speed of the host vehicle even if the overtaking section overlaps the restricted section entirely or partially. By presuming that another vehicle in the parked state does not start to move before the host vehicle passes the restricted section, the host vehicle can smoothly overtake the other vehicle without needlessly adjusting the speed of the host vehicle.

By the vehicle control device according to the present invention, it is possible to prevent the host vehicle from overtaking another vehicle in the restricted section.

The above and other objects features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

A preferred embodiment of a vehicle control device according to the present invention is hereinafter described with reference to the attached drawings.

[Structure of Vehicle Control Device 10]

Figure 1:
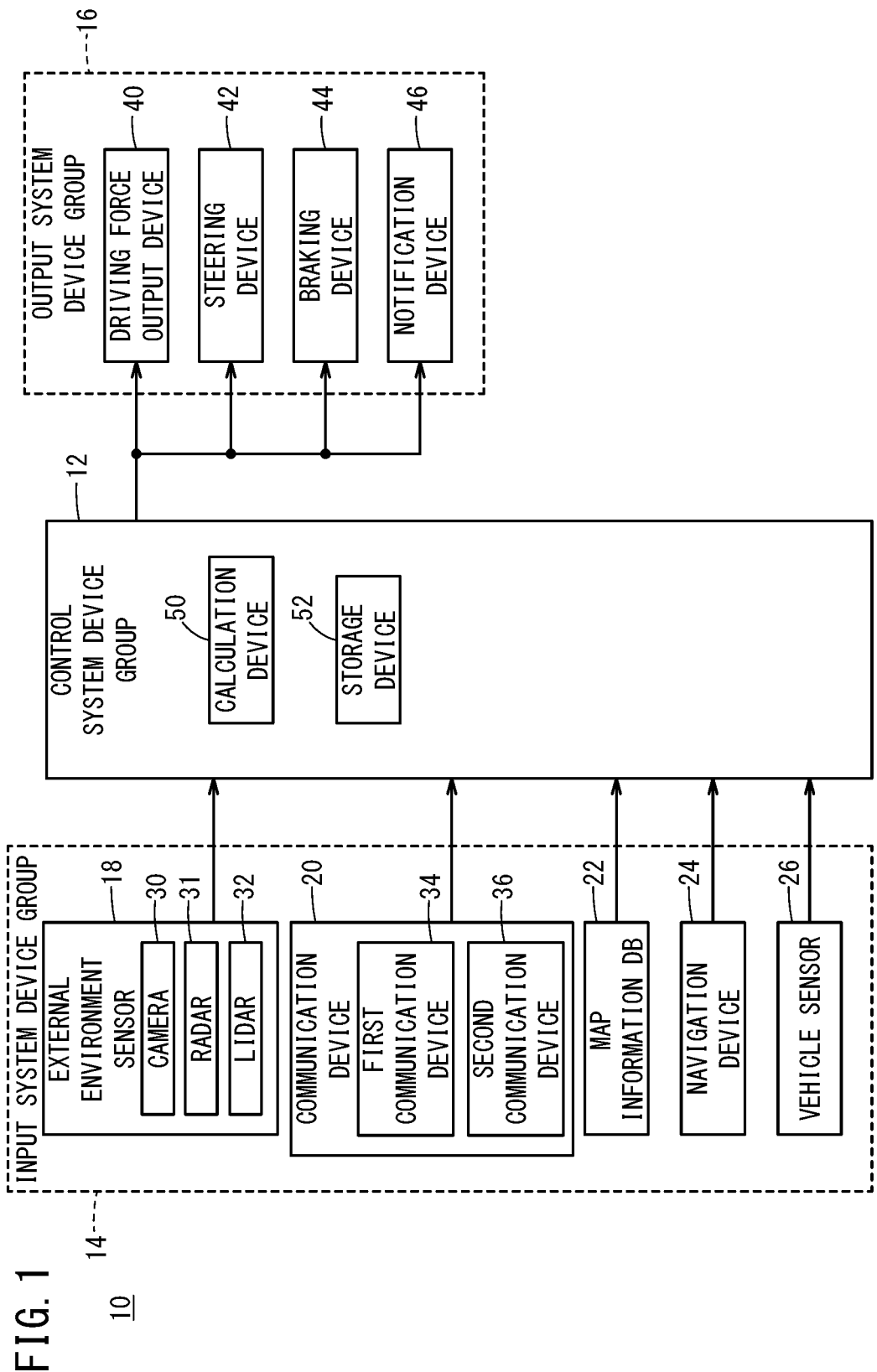
FIG. 1 is a block diagram illustrating a structure of a vehicle control device according to one embodiment of the present invention.

FIG. 1 is a block diagram illustrating a structure of a vehicle control device 10 according to one embodiment of the present invention. The vehicle control device 10 is incorporated in a vehicle (a driver's own vehicle 100 in FIG. 4, etc., which will be also referred to as a host vehicle) and controls driving of the vehicle either automatically or manually. "Automated driving" implies a concept that includes not only "fully automated driving" in which the travel control of the vehicle is performed entirely automatically, but also "partial automated driving" in which the travel control is performed partially automatically.

The vehicle control device 10 includes a control system device group 12 that collectively controls the driving of the vehicle, a device group (hereinafter referred to as an input system device group 14) that performs an input function of the control system device group 12, and a device group (hereinafter referred to as an output system device group 16) that performs an output function of the control system device group 12.

<Specific Structure of Input System Device Group 14>

The input system device group 14 includes: an external environment sensor 18 that detects a state of a periphery (external environment) of the vehicle; a communication device 20 that transmits and receives information to and from various communication devices outside the vehicle; a high-precision map database (hereinafter, map information DB 22) that acquires map information indicating a high-precision map; a navigation device 24 that generates a travel route to a destination and measures a travel position of the vehicle; and a vehicle sensor 26 that detects a state of the vehicle.

The external environment sensor 18 includes one or more cameras 30 that capture images of the external environment, one or more radars 31 that detect the distance and the relative speed between the vehicle and another object, and one or more LIDARs 32 (Light Detection and Ranging/Laser Imaging Detection and Ranging).

The communication device 20 includes a first communication device 34 that performs vehicle-to-vehicle communication with another vehicle, and a second communication device 36 that performs road-to-vehicle communication with a road-side device. The navigation device 24 includes a satellite navigation system and a self-contained navigation system. The vehicle sensor 26 includes various sensors that detect a behavior of the vehicle, such as a vehicle speed sensor, an acceleration sensor, a yaw rate sensor, and an inclination sensor, various sensors that detect an operation state of the vehicle, and various sensors that detect a state of a driver.

<Specific Structure of Output System Device Group 16>

The output system device group 16 includes a driving force output device 40, a steering device 42, a braking device 44, and a notification device 46.

The driving force output device 40 includes a driving force output electronic control unit (ECU), and a driving source such as an engine or a driving motor. The driving force output device 40 generates a driving force in response to a driver's operation on an accelerator pedal or a driving control command that is output from the control system device group 12.

The steering device 42 includes an electric power steering system (EPS)-ECU, and an EPS actuator. The steering device 42 generates a steering force in response to a driver's operation of a steering wheel or a steering control command that is output from the control system device group 12.

The braking device 44 includes a braking ECU and a braking actuator. The braking device 44 generates a braking force in response to a driver's operation of a braking pedal or a braking control command that is output from the control system device group 12.

The notification device 46 includes a notification ECU and an information transmission device (such as a display device, an acoustic device, or a tactile device). The notification device 46 notifies a driver in response to a notification command that is output from the control system device group 12 or another ECU (for example, provides information through any of five senses including visual and auditory senses).

<Specific Structure of Control System Device Group 12>

The control system device group 12 includes one or more ECUs, and includes a calculation device 50 such as a processor and a storage device 52 such as a ROM or a RAM. The control system device group 12 achieves various functions by the calculation device 50 executing programs stored in the storage device 52.

Figure 2:
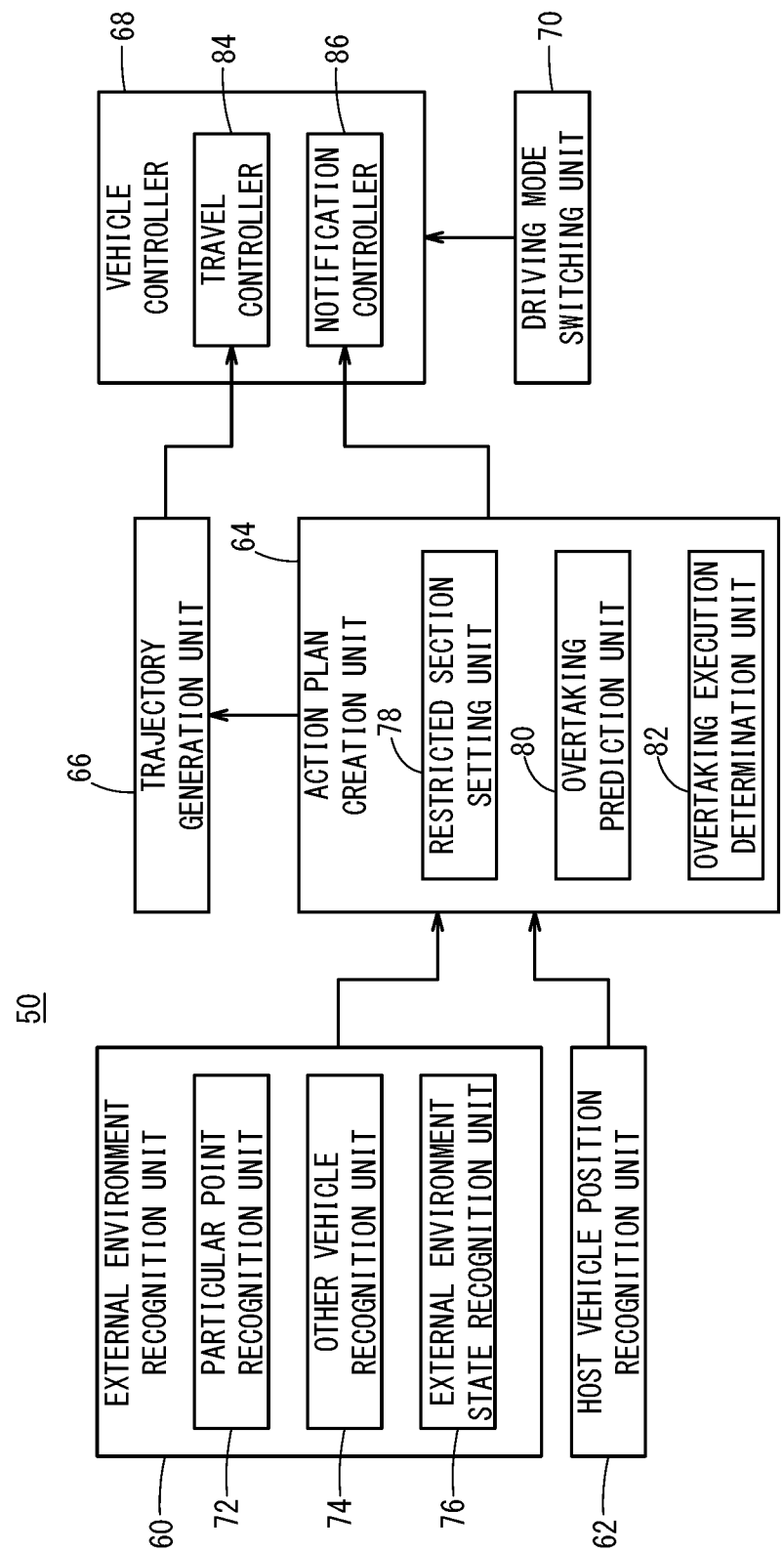
FIG. 2 is a function block diagram of a calculation device illustrated in FIG. 1.

FIG. 2 is a function block diagram of the calculation device 50 illustrated in FIG. 1. This calculation device 50 is configured to perform various functions of an external environment recognition unit 60, a host vehicle position recognition unit 62, an action plan creation unit 64, a trajectory generation unit 66, a vehicle controller 68, and a driving mode switching unit 70.

The external environment recognition unit 60 recognizes a situation and an object around the vehicle on the basis of the information output from the external environment sensor 18. This external environment recognition unit 60 includes a particular point recognition unit 72, an other vehicle recognition unit 74, and an external environment state recognition unit 76.

The host vehicle position recognition unit 62 recognizes an absolute position of the vehicle or a relative position of the vehicle on the high-precision map (hereinafter also referred to as host vehicle position) on the basis of information output from the navigation device 24 and the map information DB 22.

The action plan creation unit 64 creates an action plan (a time series of events for each travel section) in accordance with the situation of the vehicle on the basis of recognition results of the external environment recognition unit 60 and the host vehicle position recognition unit 62, and updates the content of the action plan as necessary. The action plan creation unit 64 includes a restricted section setting unit 78, an overtaking prediction unit 80, and an overtaking execution determination unit 82.

The trajectory generation unit 66 generates a travel trajectory (a time series of target behaviors) in accordance with the action plan created by the action plan creation unit 64 on the basis of the recognition results of the external environment recognition unit 60 and the host vehicle position recognition unit 62.

The vehicle controller 68 instructs the output system device group 16 (FIG. 1) to operate, on the basis of a creation result of the action plan creation unit 64 or a generation result of the trajectory generation unit 66. The vehicle controller 68 includes a travel controller 84 that performs a travel control of the vehicle, and a notification controller 86 that performs a notification control for the driver.

The driving mode switching unit 70 is configured to switch between a plurality of driving modes including "automated driving mode" and "manual driving mode" in response to a driver's predetermined action (for example, operation of input device including a mode selection switch and a steering wheel).

[Operation of Vehicle Control Device 10]

The vehicle control device 10 according to the present embodiment is structured as above. Subsequently, an operation of the vehicle control device 10 (mainly, calculation device 50) when the vehicle travels straight at an intersection 108 (FIG. 4) is described mainly with reference to a flowchart of FIG. 3. In this example, the host vehicle 100 incorporating the vehicle control device 10 travels by automated driving.

Figure 4:
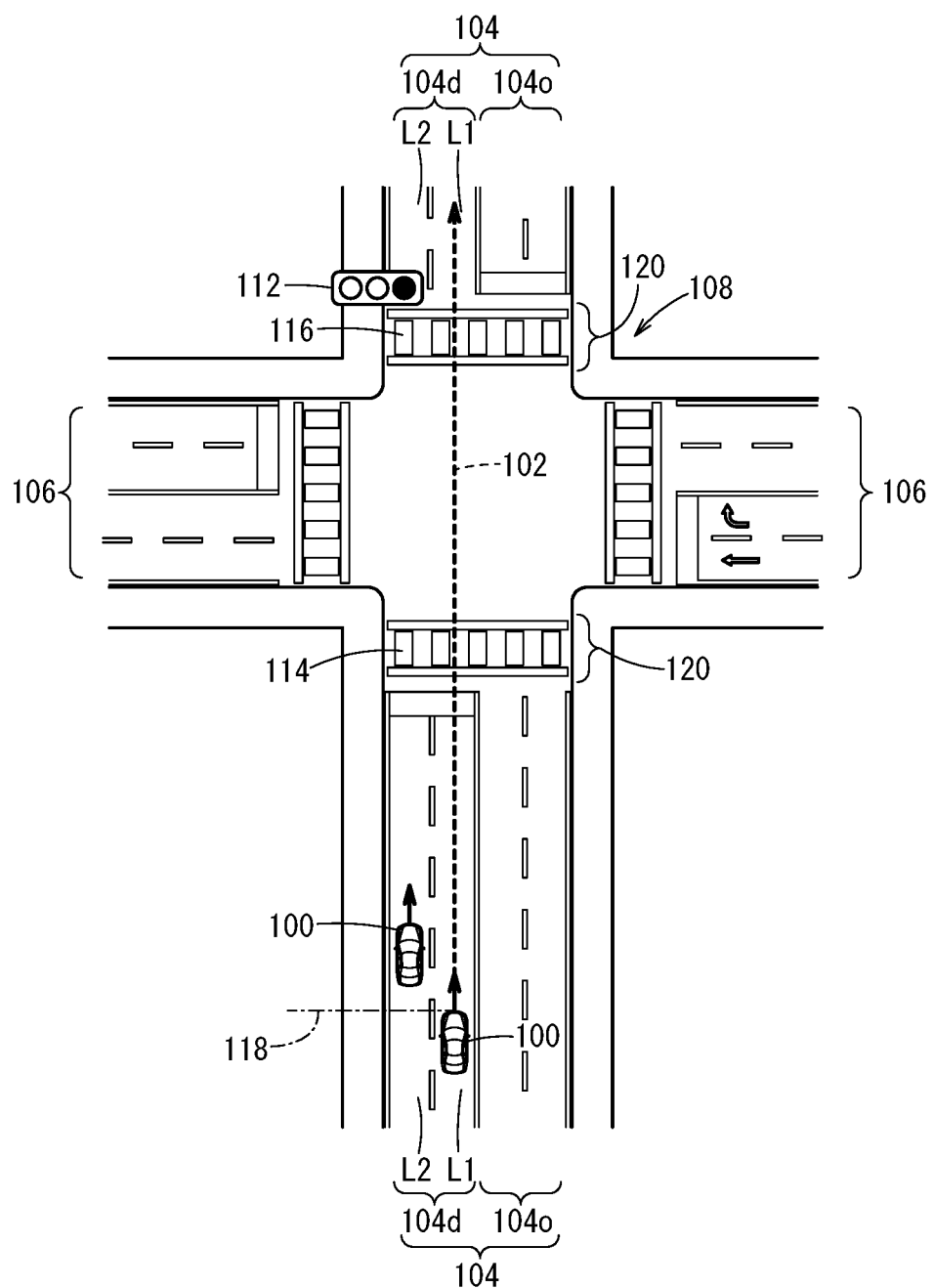
FIG. 4 is a schematic view illustrating a driving scene around an intersection.

FIG. 4 illustrates a driving scene around the intersection 108. The host vehicle 100 intends to pass a point where a road 104 and a road 106 intersect (that is, intersection 108) along a scheduled travel route 102 that is shown by a dashed arrow. Here, the scheduled travel route 102 means a route where the host vehicle 100 is scheduled to travel.

The road 104 includes four lanes: travel lanes 104d (two lanes) where the host vehicle 100 is scheduled to travel, and opposite lanes or oncoming lanes 104o (two lanes) that are opposite to the travel lanes 104d. The road 106 includes four lanes: two travel lanes and two opposite lanes.

In order to distinguish the two lanes of the travel lanes 104d, the right lane where the host vehicle 100 exists may be referred to as "first lane L1" and the left lane where another vehicle 110 exists may be referred to as "second lane L2". Here, it is assumed that the host vehicle 100 traveling straight on the first lane L1 and another vehicle 110 traveling straight on the second lane L2 pass the intersection 108.

In this drawing, vehicles drive in a country or a region where drivers should keep to "the left side" of the road. Near a corner of the intersection 108, a traffic light 112 is installed for indicating whether vehicles are permitted to go. In the intersection 108, a pedestrian crossing 114 lies in the front along a width direction of the road 104, and a pedestrian crossing 116 lies in the back along the width direction of the road 104.

Figure 3:
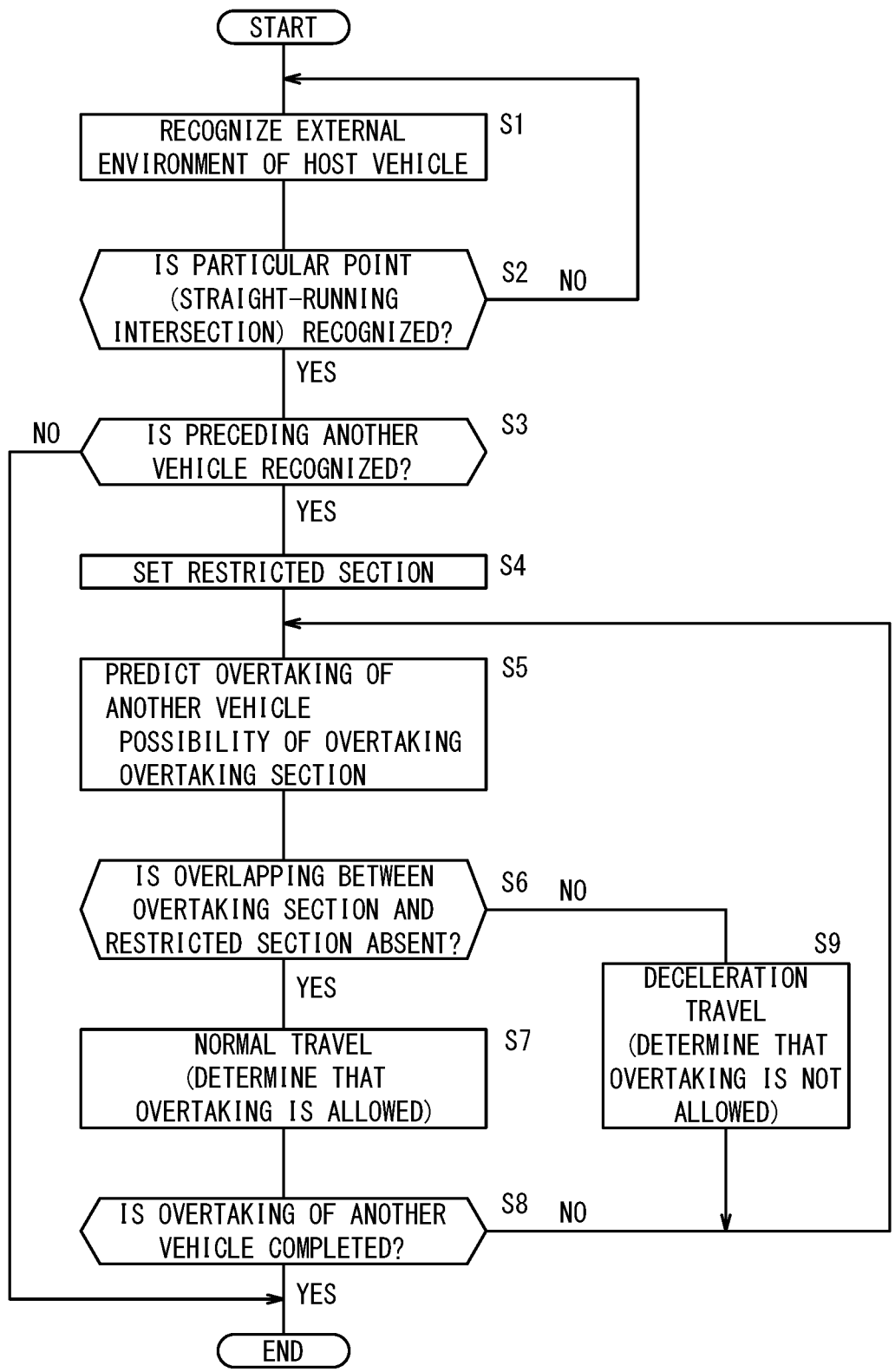
FIG. 3 is a flowchart for describing an operation of the calculation device illustrated in FIG. 1 and FIG. 2.

In step S1 in FIG. 3, the external environment recognition unit 60 recognizes the situation and the object around the host vehicle 100 on the basis of the information output from the external environment sensor 18.

For example, the particular point recognition unit 72 recognizes a particular point (here, a point at which a restricted section 120 described below is highly likely to exist) on the scheduled travel route 102 of the host vehicle 100, on the basis of the image information of the camera 30 and the map information (high-precision map) read out from the map information DB 22. If the particular point is an "intersection", the particular point recognition unit 72 recognizes the presence or absence, the type, and the size of the intersection 108, the position of a stop line, the position of the pedestrian crossings 114, 116, and the like.

For example, the other vehicle recognition unit 74 recognizes the presence or absence, the position, the size, and the type of another vehicle 110 that is in traveling state or in stopped state around the host vehicle 100, and calculates the distance and the relative speed between the host vehicle 100 and the other vehicle 110 on the basis of information output from the camera 30, the radar 31, or the LIDAR 32.

For example, the external environment state recognition unit 76 recognizes an overall road environment, such as the shape and the width of the road, the positions of lane marks, the number of lanes, the lane width, the signaling state of the traffic light 112, the open/close state of a crossing gate, and the like, on the basis of the image information of the camera 30 or the map information (high-precision map) read out from the map information DB 22.

In step S2, it is determined whether the particular point recognition unit 72 has recognized "straight-running intersection" where the host vehicle 100 is scheduled to travel straight and pass. Specifically, the particular point recognition unit 72 recognizes whether the straight-running intersection exists or not, for example, by referring to the map information from the map information DB 22 and the latest action plan (event of "running straight") that is created by the action plan creation unit 64.

In a case where the intersection 108 in FIG. 4 is not recognized (step S2: NO), the process returns to step S1, and the processes in steps S1 and S2 are repeated sequentially. On the other hand, in a case where the intersection 108 is recognized first at a time point when the host vehicle 100 reaches a recognition position 118 (step S2: YES), the process proceeds to step S3.

In step S3, the other vehicle recognition unit 74 determines whether a particular preceding vehicle has been recognized. Here, the other vehicle recognition unit 74 determines whether there is a preceding vehicle that is traveling ahead of the host vehicle 100 and in a lane different from the first lane L1 in which the host vehicle 100 is traveling.

If a particular preceding vehicle is not recognized (step S3: NO), it is determined there is no possibility that overtaking may occur, and the flowchart in FIG. 3 is brought to an end. On the other hand, in the example in FIG. 4, another vehicle 110 in the second lane L2 is recognized (step S3: YES), and thus the process proceeds to the next step S4.

In step S4, the restricted section setting unit 78 sets at least one section (hereinafter, referred to as restricted section 120) where overtaking is restricted on the scheduled travel route 102 of the host vehicle 100. For example, this "restriction" may be imposed in any of the following cases: a case where overtaking is compulsorily forbidden by traffic regulations; a case where overtaking is not desirable for traffic safety reasons; and a case where overtaking is voluntarily restricted in order to secure the performance of the vehicle control device 10.

In the example in FIG. 4, the restricted section setting unit 78 sets a travel section including the entire intersection 108 or a travel section including the pedestrian crossings 114, 116 as the restricted section 120. Note that the restricted section 120 may be, in addition to the travel section including the intersection 108 or the pedestrian crossings 114, 116, at least one of a travel section including a railroad crossing, a travel section including a bicycle crossing, and a travel section with a narrow width (width is smaller than a predetermined value).

In step S5, the overtaking prediction unit 80 predicts a situation of overtaking on the basis of the relation between vehicle information indicating a driving state (travel state) of the host vehicle 100 (hereinafter, host vehicle information) and vehicle information indicating a driving state (travel state) of the other vehicle 110 (hereinafter, another-vehicle information). The host vehicle information includes a position, speed, acceleration, or a jerk of the host vehicle 100. The another-vehicle information includes a position, speed, acceleration, or a jerk of another vehicle 110.

The situation of overtaking concretely means [1] whether there is a possibility that the host vehicle 100 may overtake the other vehicle 110 shortly and [2] if the possibility of overtaking exists, a section where the overtaking is performed (hereinafter, referred to as an overtaking section 128).

Figure 5A:
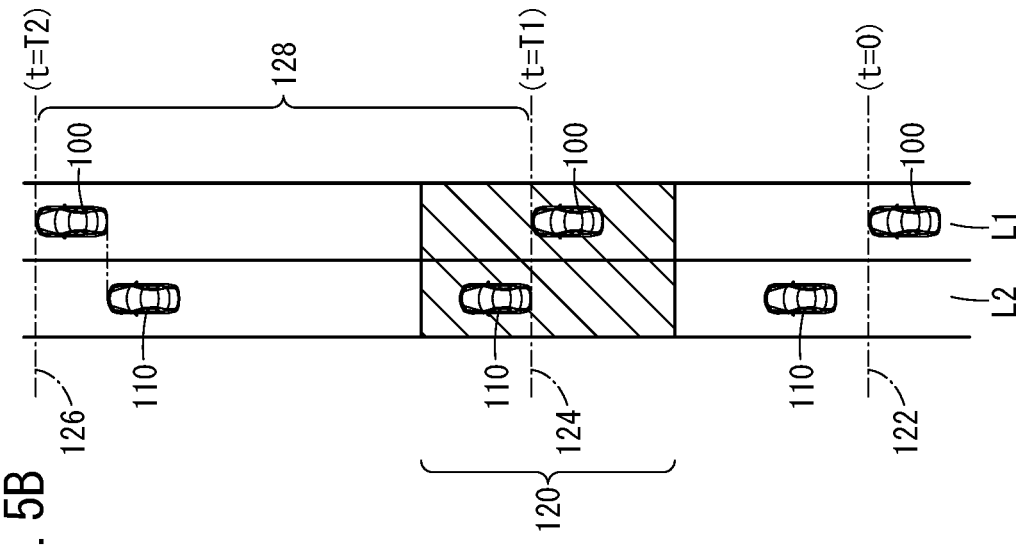
FIGS. 5A and 5B are schematic views illustrating prediction results concerning a case where a host vehicle overtakes another vehicle.
Figure 5B:
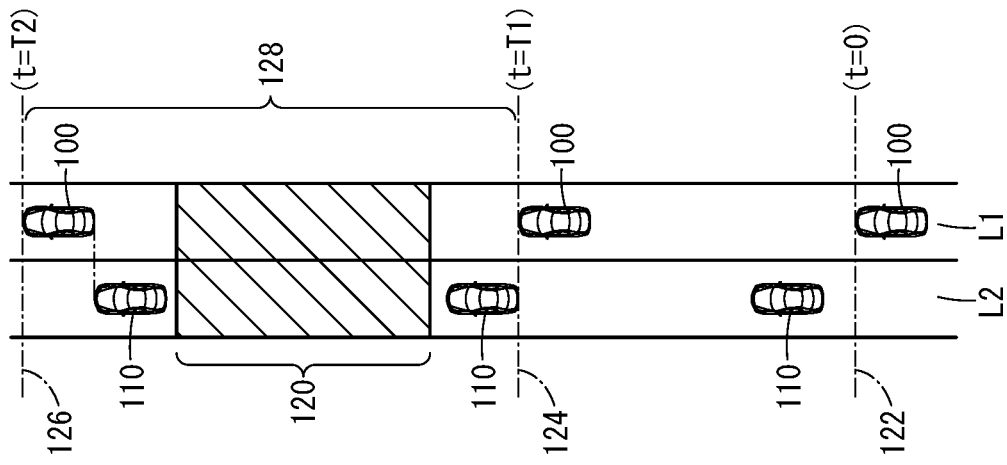

FIGS. 5A and 5B are schematic views illustrating prediction results concerning a case where the host vehicle 100 overtakes another vehicle 110. In these drawings, only main portions of the intersection 108 in FIG. 4 are illustrated for the convenience of description.

The overtaking prediction unit 80 predicts change of the host vehicle position with time and change of the another-vehicle position with time, beginning at a reference position 122 (time t=0), by using a well-known technique. For example, if there is a possibility that the host vehicle 100 soon overtakes the other vehicle 110, a first prediction position 124 (time t=T1) where a front end position of the host vehicle 100 and a rear end position of the other vehicle 110 coincide with each other is obtained. Similarly, a second prediction position 126 (time t=T2) where a rear end position of the host vehicle 100 and a front end position of the other vehicle 110 coincide with each other is obtained.

That is to say, the host vehicle 100 and the other vehicle 110 travel in parallel in a state where the positions overlap each other in a travel section from the first prediction position 124 to the second prediction position 126. This travel section (the section where overtaking of the other vehicle 110 by the host vehicle 100 is performed) is defined as an overtaking section 128. Note that the definition of the overtaking section 128 is not limited to the examples in FIG. 5A and FIG. 5B.

In step S6, the overtaking execution determination unit 82 determines whether overlapping between the overtaking section 128 predicted in step S5 and the restricted section 120 set in step S4 is absent.

In the example in FIG. 5A, the first prediction position 124 lies in front of the restricted section 120, and the second prediction position 126 lies in the back of the restricted section 120. In the example in FIG. 5B, the first prediction position 124 lies within the restricted section 120, and the second prediction position 126 lies in the back of the restricted section 120. That is to say, in both cases, part of the overtaking section 128 overlaps at least part of the restricted section 120.

For example, if it is determined that "the overlapping of the sections" between the overtaking section 128 and the restricted section 120 is absent (step S6: YES), the process proceeds to the next step S7.

In step S7, the overtaking execution determination unit 82 determines that the host vehicle 100 is "allowed to overtake" the other vehicle 110, and maintains a normal travel without changing an event content. Thus, the host vehicle 100 travels straight in the first lane L1 while exhibiting a travel behavior mostly in accordance with the prediction result by the overtaking prediction unit 80.

In step S8, the overtaking execution determination unit 82 determines whether the host vehicle 100 has completed the overtaking of the other vehicle 110. If the overtaking is not completed (step S8: NO), the process returns to step S5; then, steps S5 to S8 are sequentially repeated. On the other hand, if it has been determined that the overtaking is completed near time t=T2, (step S8: YES), the flowchart in FIG. 3 is brought to an end.

Referring back to step S6, if it is determined that "the overlapping of the sections" between the overtaking section 128 and the restricted section 120 is not absent (i.e., the overlapping occurs) as illustrated in FIGS. 5A and 5B (step S6: NO), the process proceeds to the next step S9.

In step S9, the overtaking execution determination unit 82 determines that the host vehicle 100 is temporarily "not allowed to overtake" the other vehicle 110, and updates the event content so that the speed of the host vehicle 100 is adjusted (for example, "deceleration").

Figure 6:
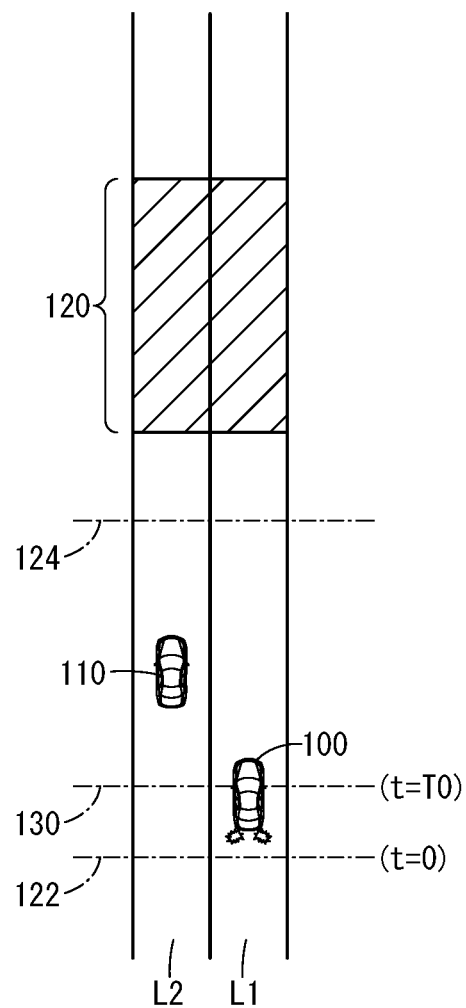
FIG. 6 is a schematic view illustrating a behavior of a host vehicle in a case where it is determined that overtaking is non-allowable.

As illustrated in FIG. 6, after reaching a deceleration start position 130 that lies a little ahead of the reference position 122, the host vehicle 100 starts a temporary deceleration operation. After the elapse of a predetermined time from a start time point of the deceleration (time t=T0) or after driving a predetermined distance from the deceleration start position 130, the process returns to step S5.

In step S5, the overtaking prediction unit 80 predicts again the situation of overtaking on the basis of the relation between the host vehicle information and the another-vehicle information. Here, it is noted that this prediction is performed on the premise that the speed of the host vehicle 100 is returned to the previous state (i.e., the target value before deceleration).

Figure 7:
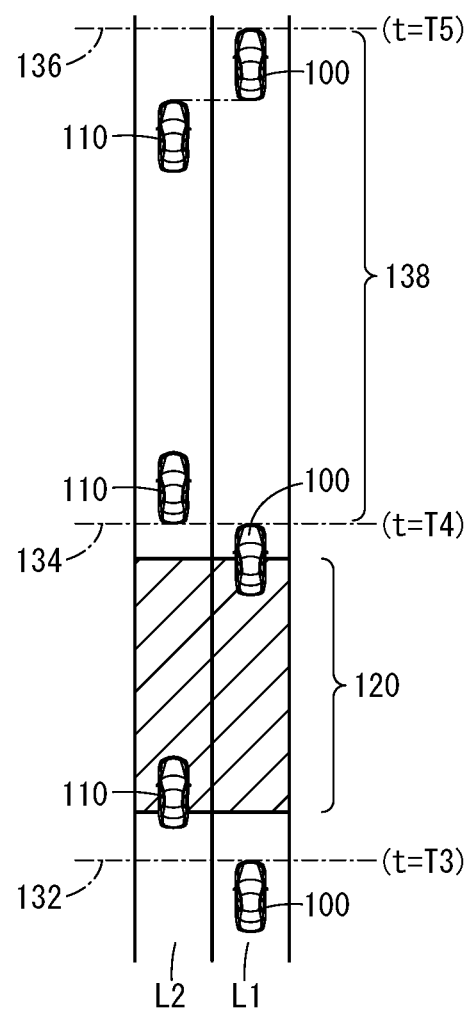
FIG. 7 is a schematic view illustrating a new prediction result concerning a case where a host vehicle overtakes another vehicle.

As illustrated in FIG. 7, the overtaking prediction unit 80 predicts change of the host vehicle position with time and change of the another-vehicle position with time, beginning at a reference position 132 (time t=T3), by using a well-known technique. For example, if there is a possibility that the host vehicle 100 soon overtakes the other vehicle 110, a first prediction position 134 (time t=T4) where the front end position of the host vehicle 100 and the rear end position of the other vehicle 110 coincide with each other is newly obtained. Similarly, a second prediction position 136 (time t=T5) where the rear end position of the host vehicle 100 and the front end position of the other vehicle 110 coincide with each other is newly obtained.

In this case, an overtaking section 138 corresponds to a travel section from the first prediction position 134 to the second prediction position 136. As a result of this prediction, overlapping between the newly-predicted overtaking section 138 and the restricted section 120 is absent (step S6: YES). In this case, the process proceeds to step S7.

In step S7, the overtaking execution determination unit 82 determines that the host vehicle 100 is "allowed to overtake" the other vehicle 110, and the speed of the host vehicle 100 is returned to the previous state so that the normal travel is restarted. Thus, the host vehicle 100 travels straight in the first lane L1 while exhibiting a travel behavior mostly in accordance with the prediction result by the overtaking prediction unit 80.

In step S8, the overtaking execution determination unit 82 determines whether the host vehicle 100 has completed the overtaking of the other vehicle 110. If the overtaking is not completed (step S8: NO), the process remains at step S8 until the overtaking is completed. On the other hand, if it is determined that the overtaking is completed near the time t=T5, (step S8: YES), the flowchart in FIG. 3 is brought to an end.

<Modifications>

Subsequently, description will be given of modifications of the aforementioned determination as to whether overtaking is allowed to be performed (step S6 in FIG. 3) with reference to FIGS. 8A and 8B.

Figure 8A:
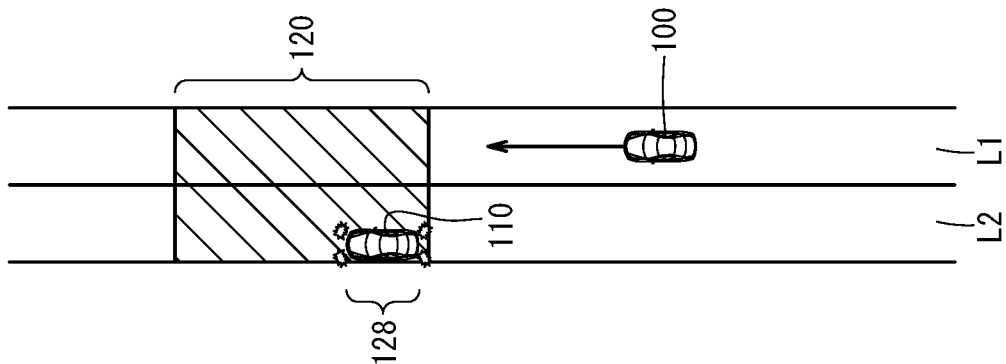
FIGS. 8A and 8B are schematic views illustrating modifications of determination as to whether it is possible to overtake another vehicle.

In an example in FIG. 8A, another vehicle 110 in the second lane L2 is in stopped state within the restricted section 120. In this case, the overtaking prediction unit 80 predicts that a section where a vehicle body of the other vehicle 110 exists is an overtaking section 128. Then, the overtaking execution determination unit 82 confirms the overlapping of the sections, and determines that the host vehicle 100 is temporarily "not allowed to overtake" the other vehicle 110. Thus, the host vehicle 100 in the first lane L1 starts the temporary deceleration operation.

In this way, the other vehicle recognition unit 74 may recognize whether another vehicle 110 is in traveling state or in stopped state, and regardless of whether the other vehicle 110 is in traveling state or in stopped state, the travel controller 84 may adjust the speed of the host vehicle 100 in a case where the overtaking section 128 overlaps the restricted section 120 entirely or partially. By assuming a scene where another vehicle 110 that is in stopped state suddenly starts to move, unintended overtaking in the restricted section 120 can be prevented.

Figure 8B:
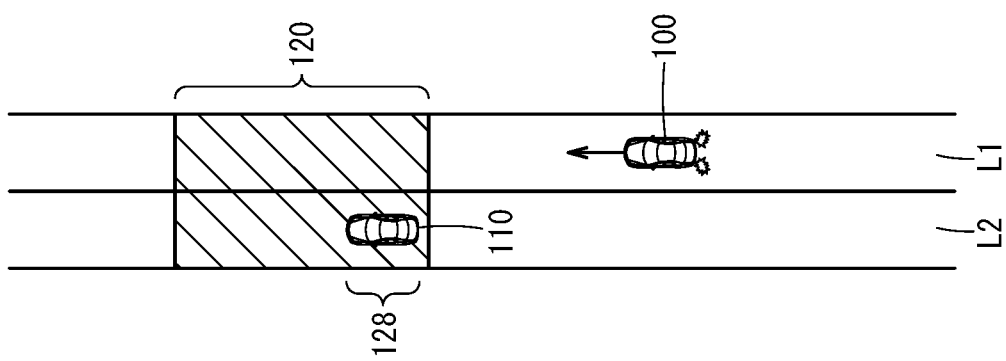

In an example in FIG. 8B, another vehicle 110 in the second lane L2 is in stopped state within the restricted section 120 as in the case of FIG. 8A. Note that, the other vehicle 110 parks with a hazard lamp on. In this case, the overtaking prediction unit 80 predicts that the section where the vehicle body of the other vehicle 110 exists is an overtaking section 128.

However, regardless of the presence of the overlapping of the sections, the overtaking execution determination unit 82 exceptionally determines that the host vehicle 100 is "allowed to overtake" the other vehicle 110. As a result, the host vehicle 100 in the first lane L1 maintains a normal travel without the temporary deceleration operation.

Thus, the other vehicle recognition unit 74 may recognize whether another vehicle 110 that is in stopped state is in a parked state, and in a case where the other vehicle 110 is in the parked state, the travel controller 84 need not perform the travel control to adjust the speed of the host vehicle 100 even though the overtaking section 128 overlaps the restricted section 120 entirely or partially. By presuming that another vehicle 110 in the parked state does not start to move before the host vehicle 100 passes the restricted section 120, the host vehicle 100 can smoothly overtake the other vehicle 110 without needlessly adjusting the speed of the host vehicle 100.

[Effect of Vehicle Control Device 10]

As described above, the vehicle control device 10 is the device configured to perform the travel control of the host vehicle 100 at least partially automatically, and includes: [1] the other vehicle recognition unit 74 configured to recognize another vehicle 110 that exists ahead of the host vehicle 100 and in the second lane L2 different from the first lane L1 where the host vehicle 100 is traveling; [2] the overtaking prediction unit 80 configured to predict the overtaking section 128 where the host vehicle 100 overtakes the other vehicle 110, on the basis of the relation between the host vehicle information indicating the driving state of the host vehicle 100 and the another-vehicle information indicating the driving state of the other vehicle 110; and [3] the travel controller 84 configured to perform the travel control to overtake the other vehicle 110. Then, [4] the travel controller 84 is configured to perform the travel control to adjust speed of the host vehicle 100 in the case where the predicted overtaking section 128 entirely or partially overlaps the restricted section 120 in which overtaking is restricted.

In this vehicle control method, one or more computers perform the following steps of: [1] recognizing another vehicle 110 that exists ahead of the host vehicle 100 and in the second lane L2 different from the first lane L1 where the host vehicle 100 is traveling (step S1); [2] predicting the overtaking section 128 where the host vehicle 100 overtakes the other vehicle 110 on the basis of the relation between the host vehicle information indicating the driving state of the host vehicle 100 and the another-vehicle information indicating the driving state of the other vehicle 110 (step S5); [3] performing the travel control to overtake the other vehicle 110 (step S7); and [4] in the case where the predicted overtaking section 128 entirely or partially overlaps the restricted section 120 in which overtaking is restricted (step S6: NO), performing the travel control to adjust speed of the host vehicle 100 (step S9).

As described above, the speed of the host vehicle 100 is adjusted in the case where the predicted overtaking section 128 entirely or partially overlaps the restricted section 120 in which overtaking is restricted. Thus, the position of the overtaking section 128 can be moved so as not to overlap the restricted section 120. Accordingly, it is possible to prevent the host vehicle 100 from overtaking another vehicle 110 in the restricted section 120.

The overtaking prediction unit 80 may newly predict the overtaking section 138 after elapse of the predetermined time from the time point (time t=T0) at which adjusting of the speed of the host vehicle 100 is started or after driving the predetermined distance from the position (deceleration start position 130) at which adjusting of the speed of the host vehicle 100 is started, and the travel controller 84 may perform the travel control to overtake the other vehicle 110 in the case where the newly predicted overtaking section 138 does not overlap the restricted section 120. Therefore, the function of retrying the overtaking can be achieved, and thus the overtaking that is scheduled originally can be performed automatically and smoothly.

[Supplement]

The present invention is not limited to the embodiment above, and can be changed freely without departing from the scope of the present invention. Alternatively, the structures may be combined arbitrarily within a range in which there is no technical inconsistency.

Although the above embodiment has described the example in which adjustment is performed to decelerate the host vehicle 100, adjustment may be performed to accelerate the host vehicle 100. That is to say, it is possible to adopt any adjusting method regarding the travel control, as long as it is possible to create a situation where the overtaking section 138 does not overlap the restricted section 120.

The present invention is also applicable to a case in which a vehicle travels on the right side of the road.

What is claimed is:

1. A vehicle control device configured to perform travel control of a host vehicle at least partially automatically, comprising one or more processors, the one or more processors being configured to:

recognize another vehicle that exists ahead of the host vehicle and in a lane different from a lane where the host vehicle is traveling;

predict a overtaking section where the host vehicle overtakes the other vehicle, based on a relation between host vehicle information indicating a driving state of the host vehicle and another-vehicle information indicating a driving state of the other vehicle; and perform travel control to overtake the other vehicle, wherein the one or more processors are further configured to determine whether the overtaking section entirely or partially overlaps a restricted section in which overtaking is restricted, perform the travel control to adjust speed of the host vehicle in a case where the overtaking section is determined to be entirely or partially overlapped with the restricted section, and wherein the overtaking section and restricted section are portions of the traveling surface on which the host vehicle is traveling.

2. The vehicle control device according to claim 1, wherein:

the one or more processors are further configured to newly predict an overtaking section after elapse of a predetermined time from a time point at which adjusting of the speed of the host vehicle is started or after driving a predetermined distance from a position at which adjusting of the speed of the host vehicle is started; and the one or more processors are further configured to perform the travel control to overtake the other vehicle in a case where the newly predicted overtaking section does not overlap the restricted section.

3. The vehicle control device according to claim 1, wherein the restricted section is at least one of a travel section including a railroad crossing, a travel section including an intersection, a travel section including a pedestrian crossing, a travel section including a bicycle crossing, and a travel section with a narrow width.

4. The vehicle control device according to claim 1, wherein:

the one or more processors are further is configured to recognize whether the other vehicle is in traveling state or in stopped state; and the one or more processors are further configured to perform the travel control to adjust the speed of the host vehicle in a case where the overtaking section overlaps the restricted section entirely or partially regardless of whether the other vehicle is in traveling state or in stopped state.

5. The vehicle control device according to claim 4, wherein:

the one or more processors are further configured to recognize whether the other vehicle that is in stopped state is in a parked state; and in a case where the other vehicle is in the parked state, the one or more processors are further configured to not perform the travel control to adjust the speed of the host vehicle even if the overtaking section overlaps the restricted section entirely or partially.

* * * * *